United States Patent
Matsumoto

(10) Patent No.: US 10,473,019 B2
(45) Date of Patent: Nov. 12, 2019

(54) EXHAUST GAS SENSOR MOUNTING STRUCTURE

(71) Applicant: SUZUKI MOTOR CORPORATION, Hamamatsu-shi, Shizuoka (JP)

(72) Inventor: Akio Matsumoto, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 38 days.

(21) Appl. No.: 15/847,202

(22) Filed: Dec. 19, 2017

(65) Prior Publication Data

US 2018/0202343 A1    Jul. 19, 2018

(30) Foreign Application Priority Data

Jan. 16, 2017 (JP) ................. 2017-004814
Jul. 5, 2017 (JP) ................. 2017-131609

(51) Int. Cl.
| | |
|---|---|
| F01N 13/00 | (2010.01) |
| F01N 3/28 | (2006.01) |
| F01N 13/08 | (2010.01) |
| F02B 61/02 | (2006.01) |

(52) U.S. Cl.
CPC ......... *F01N 13/008* (2013.01); *F01N 3/2885* (2013.01); *F01N 13/08* (2013.01); *F01N 2230/04* (2013.01); *F02B 61/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,293,744 A | * | 3/1994 | Imagawa ............ | F01N 1/06 181/238 |
| 7,334,402 B2 | * | 2/2008 | Hiraga ............... | F01N 1/084 181/255 |
| 8,985,271 B1 | * | 3/2015 | Yoshida ............. | F01N 3/2885 181/269 |
| 10,233,853 B2 | * | 3/2019 | Muramatsu ......... | F01N 3/20 |
| 2018/0051617 A1 | * | 2/2018 | Sasaki ............... | F01N 3/24 |

FOREIGN PATENT DOCUMENTS

| | | | | |
|---|---|---|---|---|
| EP | 3 064 722 A1 | | 9/2016 | |
| JP | 2016-160915 A | | 9/2016 | |
| WO | WO 2016/140336 | * | 9/2016 | ............... F01N 3/24 |

* cited by examiner

*Primary Examiner* — Binh Q Tran
(74) *Attorney, Agent, or Firm* — Stein IP, LLC

(57) ABSTRACT

An exhaust gas sensor mounting structure includes: an exhaust pipe attached to a vehicle engine; a catalyst unit which cleans exhaust gas of the engine; a silencer connected to a downstream portion of the exhaust pipe; and an exhaust gas sensor which detects a prescribed component of the exhaust gas; at least part of the catalyst unit is located in the silencer; at least part of a pipe that is connected to a downstream end portion of the catalyst unit extends alongside an outer surface of the silencer; and the exhaust gas sensor is attached so as to penetrate through an outer wall of the silencer and a wall of the pipe.

18 Claims, 6 Drawing Sheets

EXHAUST GAS SENSOR MOUNTING STRUCTURE

CROSS-REFERENCE TO RELATED APPLICATIONS

This application claims the benefit of Japanese Patent Application JP 2017-004814 filed on Jan. 16, 2017, and Japanese Patent Application JP 2017-131609 filed on Jul. 5, 2017, the entire contents of which are hereby incorporated by reference, the same as if set forth at length.

FIELD OF THE INVENTION

The present invention relates to an exhaust gas sensor mounting structure.

BACKGROUND OF THE INVENTION

With the recent tightening of exhaust gas regulations, exhaust systems for a vehicle engine are required to monitor the degree of degradation of a catalyst for cleaning exhaust gas. For example, in JP-A-2016-160915, to perform a catalyst life judgment, oxygen sensors for detecting an oxygen concentration of exhaust gas are disposed upstream and downstream of a catalyst unit.

More specifically, in JP-A-2016-160915, a box-shaped silencer is attached to a downstream end portion of an exhaust pipe and plural expansion chambers are formed inside the silencer by plural separators. The exhaust pipe is provided with the catalyst unit, and a downstream end portion of the catalyst unit extends so as to project into a prescribed expansion chamber of the silencer. The downstream oxygen sensor is attached in such a manner that its detection portion penetrates through an outer wall of the silencer and project into the prescribed expansion chamber.

SUMMARY OF THE INVENTION

However, in JP-A-2016-160915, the outer wall of the silencer is recessed partially to secure a space for housing the downstream oxygen sensor. Thus, the capacity of the expansion chamber is reduced by the recessed portion of the outer wall, possibly lowering the exhaust gas silencing effect. Furthermore, since the detection portion of the downstream oxygen sensor is exposed in the expansion chamber, the downstream oxygen sensor performs detection on exhaust gas that has passed through the catalyst unit and has been diffused in the expansion chamber. As a result, the downstream oxygen sensor may not be able to detect an oxygen concentration of exhaust gas that has passed through the catalyst unit.

The present invention has been made in view of the above circumstances, and an object of the invention is therefore to provide an exhaust gas sensor mounting structure capable of mounting a downstream exhaust gas sensor without lowering the detection accuracy of an exhaust gas component.

An exhaust gas sensor mounting structure according to an aspect of the invention has: an exhaust pipe attached to a vehicle engine; a catalyst unit which cleans exhaust gas of the engine; a silencer connected to a downstream portion of the exhaust pipe; and an exhaust gas sensor which detects a prescribed component of the exhaust gas, wherein: at least part of the catalyst unit is located in the silencer; at least part of a pipe that is connected to a downstream end portion of the catalyst unit extends alongside an outer surface of the silencer; and the exhaust gas sensor is attached so as to penetrate through an outer wall of the silencer and a wall of the pipe.

The invention makes it possible to mount an exhaust gas sensor without lowering the detection accuracy of an exhaust gas component.

DESCRIPTION OF SYMBOLS

Figure 1:
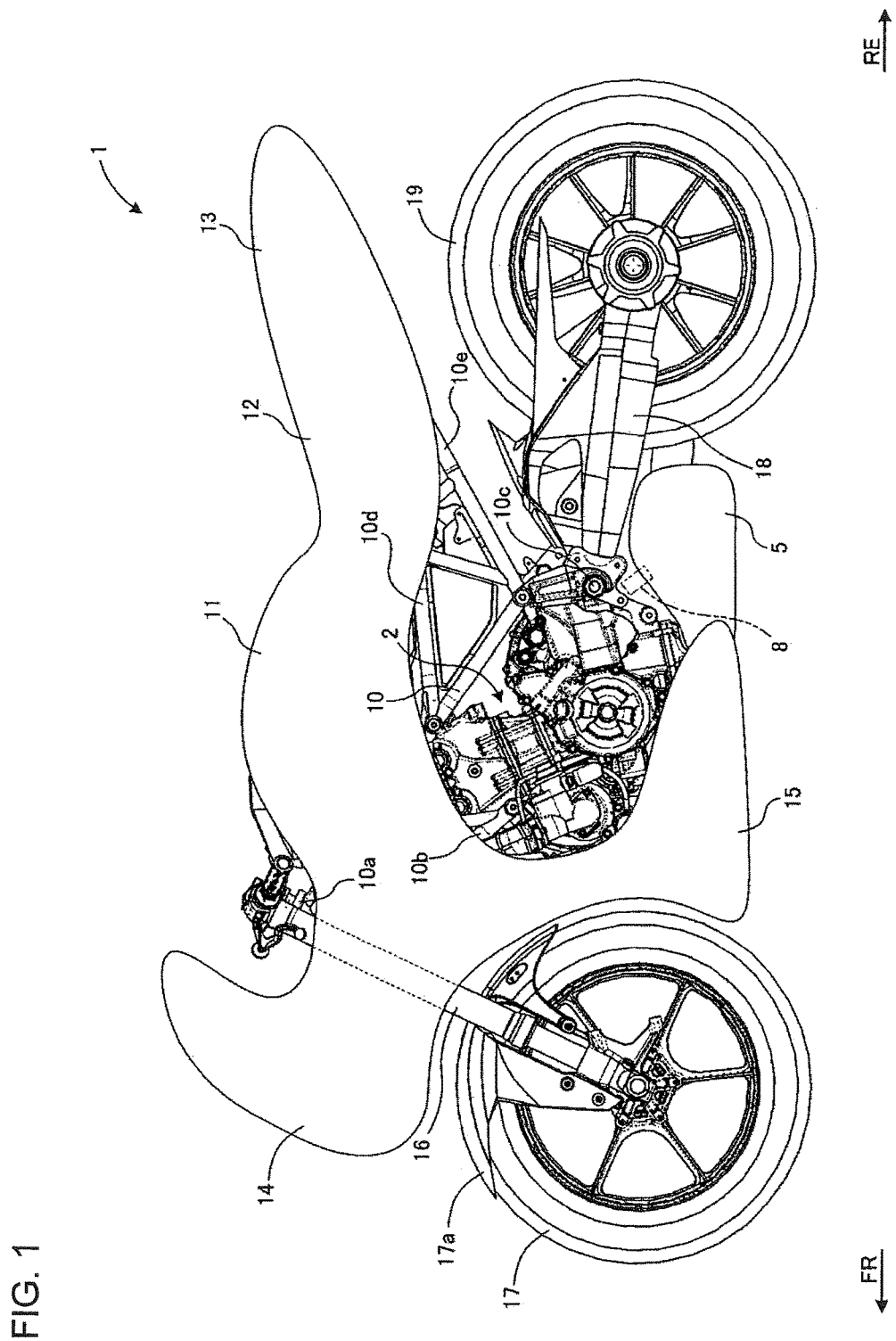
FIG. 1 is a left side view outlining the configuration of a motorcycle according to an embodiment of the present invention.

1: Motorcycle
10: Vehicle body frame
10c: Pivot portion
10f: Suspension bracket
10g: Fixing bracket
18: Swing arm
2: Engine
20: Crack case
4: Exhaust pipe
40: Connection portion
5: Silencer
5d: Slant surface
54: Baffle pipe
54b: U-shaped pipe
6: Catalyst unit
7: Upstream sensor (exhaust gas sensor)
8: Downstream sensor (exhaust gas sensor)

DETAILED DESCRIPTION OF THE INVENTION

An embodiment of the present invention will be hereinafter described in detail with reference to the accompanying drawings. Although the following description will be directed to a case that the exhaust gas sensor mounting structure according to the invention is applied to a sport motorcycle, it can also be applied to other vehicles such as other types of motorcycles, buggy-type motor tricycles, and automobiles. The forward, backward, leftward, and rightward directions with respect to the vehicle will be indicated by arrows FR, RE, L, and R, respectively. In each drawing, some components are omitted for convenience of description.

Figure 2:
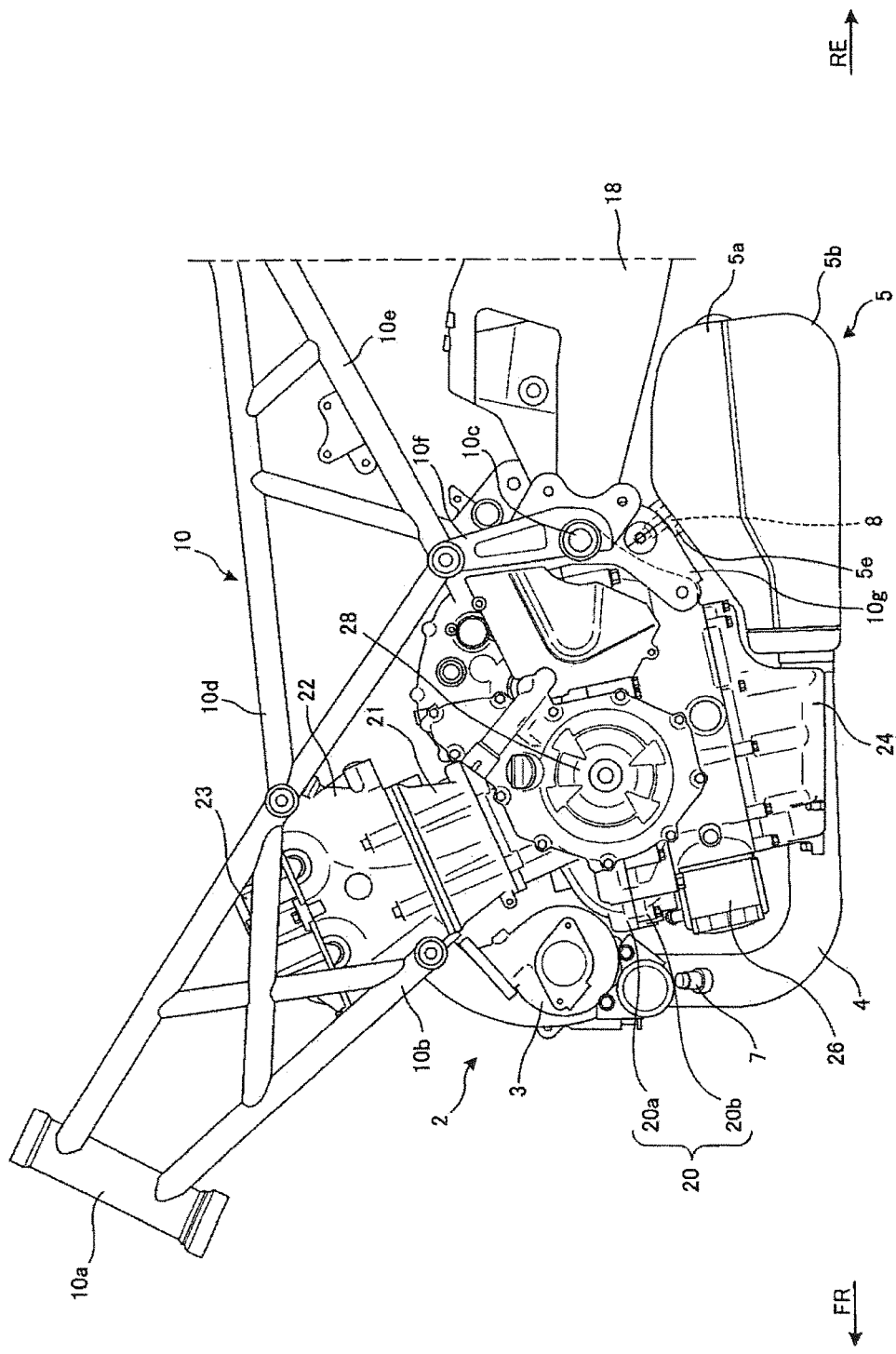
FIG. 2 is a left side view showing the arrangement of an engine and components around it which are employed in the embodiment.

First, the configuration of a motorcycle 1 according to the embodiment will be outlined with reference to FIGS. 1 and 2. FIG. 1 is a left side view outlining the configuration of the motorcycle 1 according to the embodiment. FIG. 2 is a left side view showing the arrangement of an engine 2 and components around it which are employed in the embodiment.

As shown in FIGS. 1 and 2, the motorcycle 1 is configured in such a manner that the engine 2 is suspended from a vehicle body frame 10 which is mounted with various components such as a power unit and electric components. For example, the engine 2 is a parallel two-cylinder, water-cooled engine. The engine 2 is configured in such a manner that a cylinder block 21, a cylinder head 22, and a cylinder head cover 23 are attached to a top portion of a crank case 20 which houses, among other things, a crank shaft (not shown) which extends in the left-right direction. An oil pan 24 is disposed below the crank case 20.

In the embodiment, the crank case 20, the cylinder block 21, the cylinder head 22, and the cylinder head cover 23 are together called an engine case. As shown in FIG. 2, the crank case 20, which is part of the engine case, is configured so as to be dividable in the top-bottom direction and has an upper case 20a and a lower case 20b. When the upper case 20a and the lower case 20b are combined together to form the crank case 20, a space for housing various shafts is formed in the crank case 20. In particular, the external shape of a bottom-rear portion of the engine case (oil pan 24 and lower case 20b) has such a side profile as to go up as the position goes rearward.

An oil filter 26 for filtering oil used in the engine 2 is attached to a front portion of the lower case 20b. A magneto cover 28 which covers a magneto (not shown) is attached, as an engine cover, to a left portion of the crank case 20.

The vehicle body frame 10 is a diamond-shaped frame that is formed by welding, for example, metal pipes together, and is configured so that the vehicle body is given necessary stiffness as a whole when the engine 2 is suspended from it as described above. The vehicle body frame 10 extends down rearward from a head pipe 10a. The vehicle body frame 10 has, as its front half, a bracket portion 10b which supports a front portion (cylinder head 22) of the engine 2. And the vehicle body frame 10 has, as its rear portion, a pivot portion 10c to be a swing shaft for a swing arm 18. As described later in detail, the pivot portion 10c is composed of suspension brackets 10f from which a rear portion of the engine 2 is suspended, fixing brackets 10g to which a silencer 5 is fixed, and a rear portion of the crank case 20.

The vehicle body frame 10 has, approximately at the center in the front-rear direction, a seat rail 10d which extends rearward. The vehicle body frame 10 has, above the pivot portion 10c, a back stay 10e which extends up rearward. A fuel tank 11 is disposed over the vehicle body frame 10, and a rider seat 12 and a pillion seat 13 are provided in the rear of the fuel tank 11 along the seat rail 10d. The head pipe 10a is covered with a front cowl 14 and a bottom-front portion of the engine 2 is covered with an under cowl 15.

To enable steering, a pair of (left and right) front fork members 16 are supported by the head pipe 10a via a sheering shaft (not shown). A front wheel 17 is disposed under and supported rotatably by the front fork members 16, and is covered with a front fender 17a from above.

The swing arm 18 is supported swingably by the pivot portion 10c and extends rearward. A rear wheel 19 is supported rotatably by a rear end portion of the swing arm 18.

An exhaust pipe 4 is attached to an exhaust port of the engine 2 via a turbocharger 3. The exhaust pipe 4 extends downward from a front portion of the engine 2, is then bent rearward at a position on the front-right of the oil pan 24, and then extends rearward parallel with the right side surface of the oil pan 24. The silencer 5 (also called a chamber or a muffler) is connected to a downstream end portion of the exhaust pipe 4. In the embodiment, the turbocharger 3 may be omitted.

As described later in detail, a catalyst unit 6 (see FIG. 4) for cleaning exhaust gas of the engine 2 is disposed downstream of the exhaust pipe 4. The catalyst unit 6 is housed in the silencer 5. The catalyst is a three-way catalyst, for example, and converts pollutants (carbon monoxide, hydrocarbons, nitrogen oxides, etc.) in exhaust gas into harmless substances (carbon dioxide, water, nitrogen, etc.). Exhaust gas produced by combustion of the engine 2 flows through the exhaust pipe 4 to the catalyst unit 6, where it is cleaned. Then the exhaust gas is lowered in the level of exhaust sound in passing through the silencer 5 and discharged to the outside.

An upstream sensor 7 and a downstream sensor 8 are disposed upstream and downstream of the catalyst unit 6 as exhaust gas sensors for detecting a prescribed component of exhaust gas. The upstream sensor 7 is attached to the exhaust pipe 4 at a halfway position and the downstream sensor 8 is attached to the silencer 5. For example, each of the upstream sensor 7 and the downstream sensor 8 is a zirconia oxygen sensor which detects oxygen as the prescribed component of exhaust gas. In each of the upstream sensor 7 and the downstream sensor 8, the output (current value) varies according to the oxygen concentration of exhaust gas. The current value is supplied to an ECU (electronic control unit; not shown). The upstream sensor 7 and the downstream sensor 8 are not limited to oxygen sensors and may be air-fuel ratio sensors.

The ECU controls various kinds of operations of the motorcycle 1 in a centralized manner. The ECU is composed of a processor which performs various kinds of processing in the motorcycle 1, memories, etc. The memories are storage media such as a ROM (read-only memory) and a RAM (random access memory). The memories are stored with, among other things, control programs for controlling individual components of the motorcycle 1. In particular, in the embodiment, the ECU performs a judgment as to deterioration of the catalyst on the basis of outputs of the exhaust gas sensors 7 and 8. For example, the ECU judges deterioration of the catalyst on the basis of the ratio between the numbers of times of rich/lean output inversion of the upstream sensor 7 and the downstream sensor 8. The method for judging deterioration of the catalyst is not limited to the method of using the ratio between the numbers of times of rich/lean output inversion and may be a method of using the difference between outputs of the upstream sensor 7 and the downstream sensor 8.

Incidentally, as described above, with the recent tightening of exhaust gas regulations, exhaust systems for a vehicle engine are required to monitor the degree of degradation of a catalyst for cleaning exhaust gas. To judge deterioration of the catalyst, it is necessary to install exhaust gas sensors upstream and downstream of a catalyst unit.

It is a conventional procedure to detect an oxygen concentration of exhaust gas by an exhaust gas sensor (oxygen sensor) disposed upstream of a catalyst unit and control the air-fuel ratio. However, when it is intended to install an exhaust gas sensor also downstream of the catalyst unit in motorcycles, it is difficult to dispose the exhaust gas sensor downstream of and close to the catalyst unit while securing necessary detection accuracy, due to layout-related restrictions that are specific to motorcycles.

In contrast, in automobiles, since the catalyst unit can be disposed in a place having a space margin such as the inside of the engine room, the downstream exhaust gas sensor can be installed and protected relatively easily. In motorcycles, since in many cases the catalyst unit is disposed in the chamber or muffler, as mentioned above it is difficult to dispose a downstream exhaust gas sensor close to the catalyst unit due to the structure-related reason. Also where the catalyst unit is disposed inside the exhaust pipe at a halfway position, since in many cases the exhaust pipe is close to nearby components, it is difficult to secure a space for installation of the downstream exhaust gas sensor. Furthermore, in motorcycles, since the exhaust system is exposed to the outside, in winter or during a ride in the rain, for example, there may occur a case that the temperature of the catalyst tends to become so low that a proper sensor output cannot be obtained. It is also difficult to protect the downstream exhaust gas sensor.

For example, where the catalyst unit is disposed in the silencer such as a chamber or a muffler, it is conceivable to secure an installation space of the downstream exhaust gas sensor by recessing the outer wall of the silencer. However, since this decreases the capacity of the silencer, its intrinsic function (output increasing or silencing) may be impaired. Although it is also conceivable to dispose the catalyst unit at a front position of the vehicle, this is not very realistic because large-scale design changes are necessary in addition to the fact that in the first place it is difficult to secure an installation space of the catalyst unit. And this results in various other problems and issues such as heat-related trouble due to the catalyst unit as a heat source coming closer to a rider, output reduction, how to protect the downstream exhaust gas sensor, and deterioration in exterior design.

The present inventor conceived the invention paying attention to a limited space between the engine case and the silencer 5 which is disposed in the bottom-rear of the engine 2. More specifically, in the embodiment, the catalyst unit 6 is disposed inside the silencer 5 which is disposed in the bottom-rear of the crank case 20 and at least part of a baffle pipe 54 (see FIG. 4) which is connected to a downstream end portion of the catalyst unit 6 extends alongside an outer surface of the silencer 5. The downstream sensor 8 is attached so as to penetrate through the outer walls of the silencer 5 and the baffle pipe 54 at a location where the baffle pipe 54 is close to the outer wall of the silencer 5.

With this structure, even if the catalyst unit 6 is disposed inside the silencer 5, the downstream sensor 8 can be disposed close to the catalyst unit 6, which prevents lowering of the exhaust gas detection accuracy. Furthermore, since the downstream sensor 8 is attached to the baffle pipe 54 which is connected to the downstream end portion of the catalyst unit 6, exhaust gas that has been cleaned by the catalyst unit 6 is brought into contact with the downstream sensor 8 directly, that is, without being diffused, which allows the downstream sensor 8 to produce a stable output. Still further, since the downstream sensor 8 is disposed in the space formed by the engine 2, the vehicle body frame 10, and the silencer 5, the degree of freedom of attachment of the downstream sensor 8 to the silencer 5. What is more, since the downstream sensor 8 can be disposed without recessing the silencer 5, no part of the capacity of the silencer 5 is sacrificed.

Figure 3:
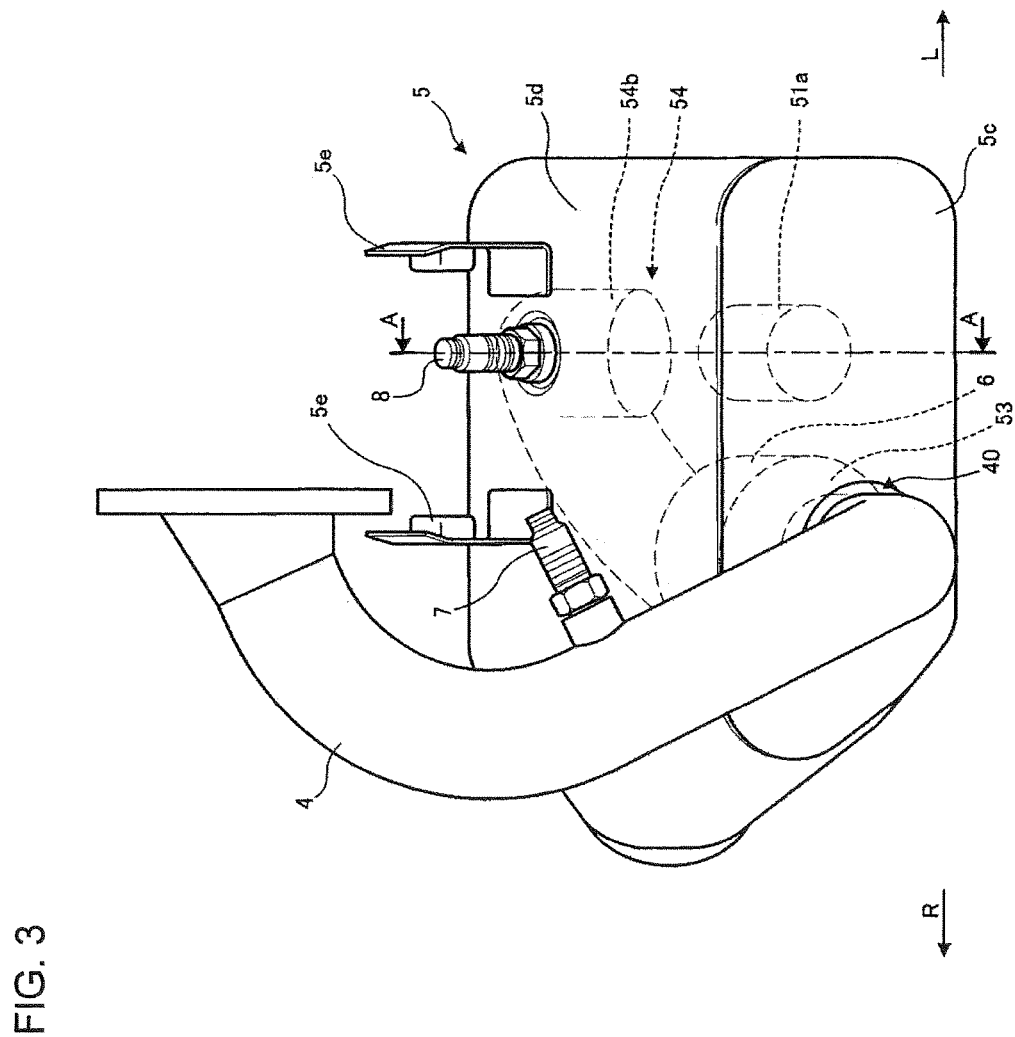
FIG. 3 is a front view of an exhaust pipe and a silencer employed in the embodiment.
Figure 4:
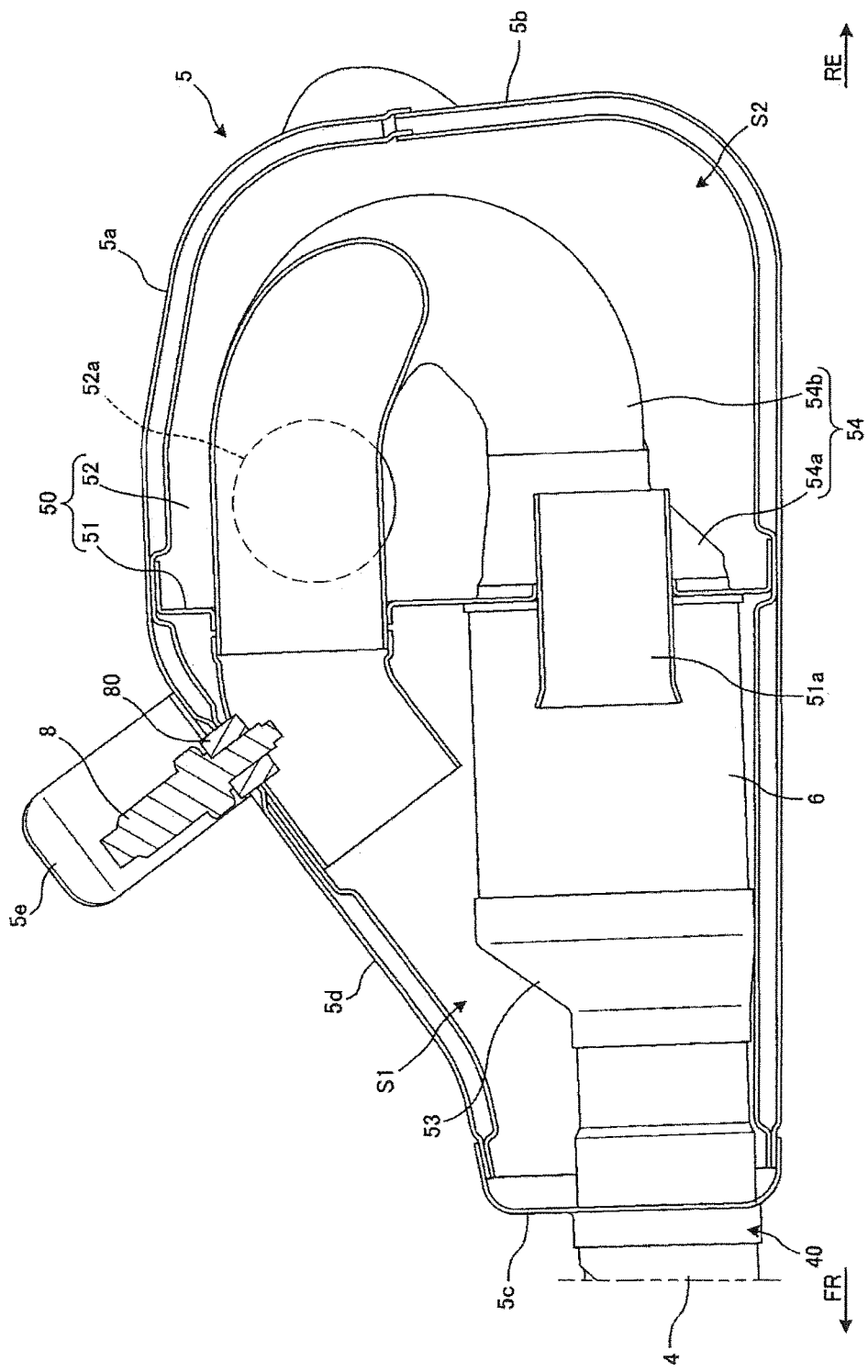
FIG. 4 is a sectional view taken along line A-A in FIG. 3.
Figure 5:
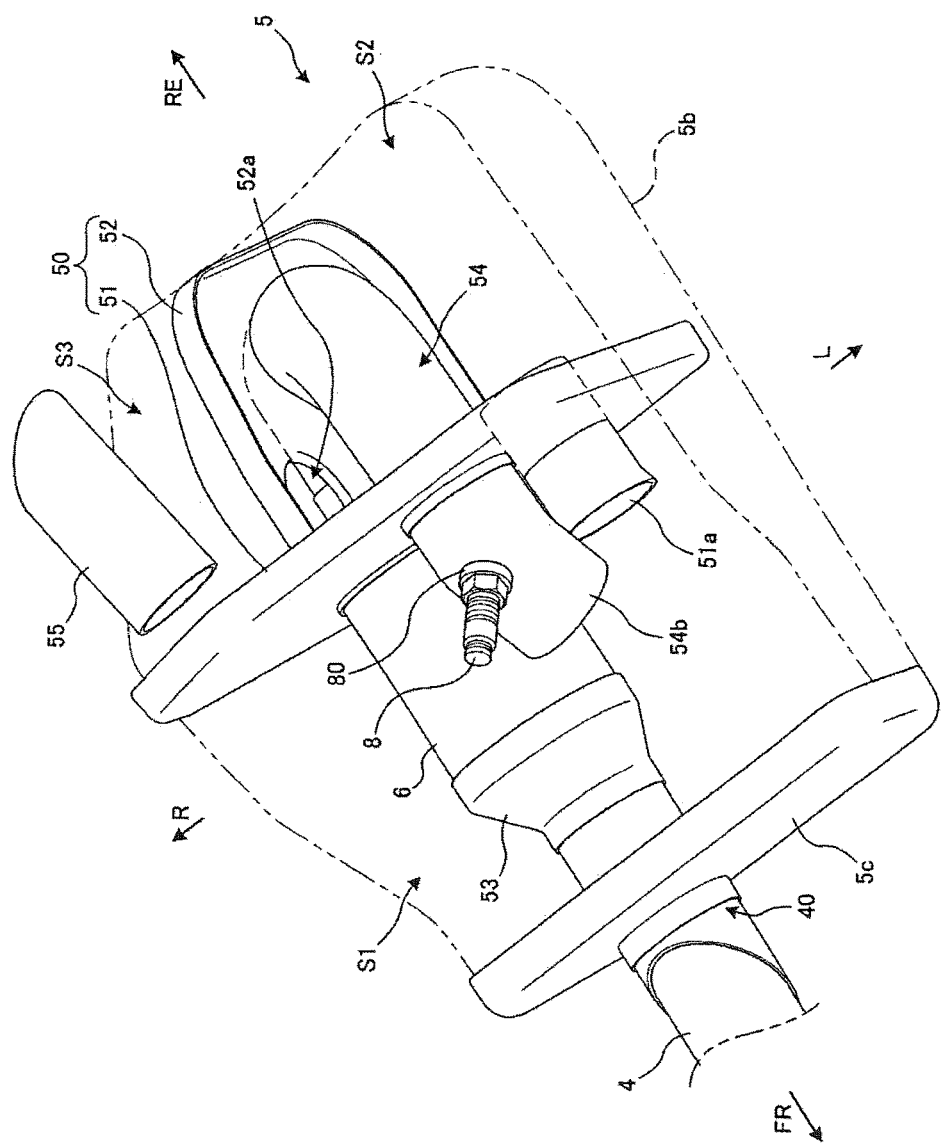
FIG. 5 is a perspective view of the silencer employed in the embodiment.

Next, the silencer 5 employed in the embodiment will be described in detail with reference to FIGS. 2-5. FIG. 3 is a front view of the exhaust pipe 4 and the silencer 5 employed in the embodiment. FIG. 4 is a sectional view taken along line A-A in FIG. 3. FIG. 5 is a perspective view of the silencer 5 employed in the embodiment.

As shown in FIG. 2 which is a side view, the silencer 5 is disposed in the rear of the oil pan 24 and below the swing arm 18 and connected to a downstream end portion of the exhaust pipe 4. As shown in FIG. 3, the exhaust pipe 4 is disposed so as to deviate rightward from the center plane, in the left-right direction, of the silencer 5 which is shaped like a box.

As shown in FIGS. 4 and 5, the silencer 5 is formed into a box shape by welding together an upper half portion 5a which is open at the bottom, a lower half portion 5b which is open at the top, and a front wall portion 5c which covers front end portions of the upper half portion 5a and the lower half portion 5b. The exhaust pipe 4 is attached to the silencer 5 so as to penetrate through the front wall portion 5c.

In a side view, a front half portion of the silencer 5 is approximately shaped like a triangle whose height increases as the position goes rearward and its rear half portion is shaped like a rectangle. As for the front half portion of the silencer 5, the height of an upstream portion is a little larger than the outer diameter of the exhaust pipe 4 and the outer surface that corresponds to the hypotenuse of the approximately triangular shape in a side view is inclined so as to extend up rearward. That is, the top surface of a front half portion of the upper half portion 5a of the silencer 5 is a slant surface 5d which goes up as the position goes rearward.

The downstream sensor 8 (described later) is attached to the slant surface 5d. The slant surface 5d is formed with a pair of support portions 5e which are used for attaching the silencer 5 to the engine 2. The pair of support portions 5e are disposed in such a manner that the downstream sensor 8 is interposed between them in the left-right direction and included in them in a side view. The bottom surface of the lower half portion 5b of the silencer 5 extends horizontally rearward. A rear half portion of the silencer 5, which is continuous with its front half portion, extends horizontally rearward.

The internal space of the silencer 5 is divided into plural expansion chambers by baffle plates 50 which are a first baffle plate 51 that partitions the internal space of the silencer 5 into a front half portion and a rear half portion and a second baffle plate 52 that divides the rear half portion into two parts in the left-right direction. The first baffle plate 51 is a flat, vertical partition wall that is located in the vicinity of the boundary between the front half portion and the rear half portion of the silencer 5, that is, approximately at the center of the silencer 5 in the front-rear direction. The second baffle plate 52 is a vertical partition wall that is the same in vertical width as the first baffle plate 51 and extends rearward from approximately the center of the first baffle plate 51 in the left-right direction.

As described above, the internal space of the silencer 5 is partitioned into three expansion chambers S1, S2, and S3 by the baffle plates 50. The expansion chamber S1 is the internal space of the front half portion of the silencer 5, the expansion chamber S2 is the internal space of a left-hand portion of the rear half portion of the silencer 5, and the expansion chamber S3 is the internal space of a right-hand portion of the rear half portion of the silencer 5. A communication pipe 51a penetrates through the first baffle plate 51 in its thickness direction at a bottom-left position to have the expansion chambers S1 and S2 communicate with each other. The communication pipe 51a is shaped like a cylinder and extends in the front-rear direction. A communication hole 52b penetrates through the second baffle plate 52 in its thickness direction near its top-front corner to have the expansion chambers S2 and S3 communicate with each other.

As described above, the exhaust pipe 4 penetrates through a right half portion of the front wall portion 5c and an upstream end portion of the catalyst unit 6 is connected to a rear end portion of the exhaust pipe 4 via a first tapered pipe 53. The baffle pipe 54 (pipe) which is an exhaust gas passage in the silencer 5 is connected to a downstream end portion of the catalyst unit 6.

The first tapered pipe 53 is connected to the downstream end portion of the exhaust pipe 4 and increases in diameter as the position goes downstream (rearward). More specifically, in a side view, the first tapered pipe 53 increases in diameter mostly in its top portion. The catalyst unit 6 is connected to a rear end portion of the first tapered pipe 53. The catalyst unit 6 is shaped like a cylinder, extends in the front-rear direction, and is larger in diameter than the exhaust pipe 4. The catalyst unit 6 is configured in such a manner that a cylindrical honeycomb portion for oxidizing or reducing prescribed components of exhaust gas is covered with an outer cylindrical portion.

The catalyst unit 6 is disposed in the upstream (front) expansion chamber S1 of the silencer 5. This structure makes it possible to introduce exhaust gas having a relatively high temperature into the catalyst unit 6 because the catalyst unit 6 can be disposed at as upstream a position as possible. As a result, the temperature of the catalyst is increased to accelerate the cleaning of exhaust gas, that is, enhance the cleaning performance.

The baffle pipe 54 includes a second tapered pipe 54a which is connected to the downstream end portion of the catalyst unit 6 and a U-shaped pipe 54b which is connected to a downstream end portion of the second tapered pipe 54a. The second tapered pipe 54a decreases in diameter as the position goes downstream (rearward). More specifically, in a side view, the second tapered pipe 54a decreases in diameter mostly in its bottom portion. An upstream end portion of the second tapered pipe 54a is attached to the first baffle plate 51 so as to penetrate through it. The downstream end portion of the catalyst unit 6 is supported by the first baffle plate 51. A downstream end portion of the second tapered pipe 54a is located in the expansion chamber S3.

The U-shaped pipe 54b extends rearward in the expansion chamber S3 while being kept the same in diameter as the downstream end portion of the second tapered pipe 54a, and is then bent so as to penetrate through the second baffle plate 52 right to left. In particular, as shown in FIG. 3, the U-shaped pipe 54b is inclined so as to extend up rightward and is bent so as to assume a U shape when viewed from a top-right position. The bent portion of the U-shaped pipe 54b is located around the position where the U-shaped pipe 54b crosses the second baffle plate 52.

After penetrating through the second baffle plate 52, the U-shaped pipe 54b extends forward in the expansion chamber S2 and then penetrates through the first baffle plate 51 at a position close to its top-left corner to go into the expansion chamber S1. A downstream end portion of the U-shaped pipe 54b is bent obliquely downward in the expansion chamber S1 so as to extend alongside the slant surface 5d (outer surface) of the upper half portion 5a, and is opened in the expansion chamber S1. A tail pipe 55 which extends rearward is attached to portions, located on the two respective sides of the horizontal dividing plane and constituting the expansion chamber S3, of the upper half portion 5a and the lower half portion 5b. A tip portion of the tail pipe 55 penetrates through the wall of the silencer 5 at a rear-right position and projects into the expansion chamber S3.

Exhaust gas produced by combustion of the engine 2 is discharged from the exhaust port and introduced into the silencer 5 via the exhaust pipe 4. In the silencer 5, the exhaust gas is cleaned by the catalyst unit 6 and then discharged to the outside from the rear-end tail pipe 55 via the baffle pipe 54 and the expansion chambers S1-S3. More specifically, after passing through the catalyst unit 6, the exhaust gas is changed in flowing direction by the U-shaped pipe 54b and diffused in the expansion chamber S1. Subsequently, the exhaust gas is introduced into the expansion chamber S2 from the expansion chamber S1 via the communication pipe 51a, then introduced into the expansion chamber S3 through the communication hole 52b, and finally ejected from the expansion chamber S3 to the outside via the tail pipe 55.

The exhaust gas is decreased in sound level gradually in flowing through the expansion chambers S1-S3. In particular, the capacities of the expansion chambers S1-S3 decrease gradually in this order, that is, in the order of passage of the exhaust gas, whereby the exhaust gas silencing effect is adjusted so as to vary stepwise.

Figure 6:
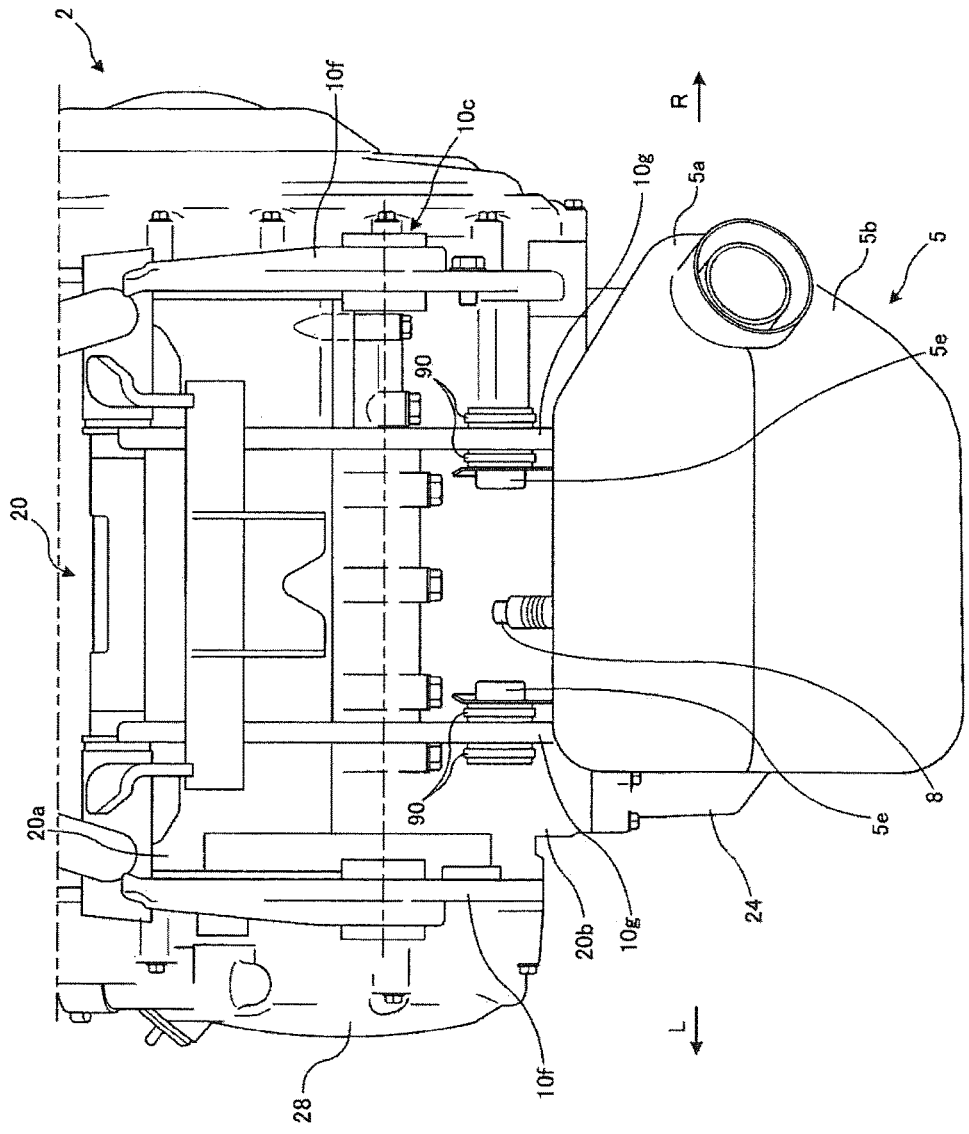
FIG. 6 is a rear view showing the arrangement of a downstream exhaust gas sensor and components around it which are employed in the embodiment.

Next, the exhaust gas sensor mounting structure according to the embodiment will be described with reference to FIGS. 2-6. FIG. 6 is a rear view showing the arrangement of the downstream exhaust gas sensor 8 and components around it which are employed in the embodiment.

As described above, the exhaust gas sensors (upstream sensor 7 and downstream sensor 8) are disposed upstream and downstream of the catalyst unit 6. Each of the exhaust gas sensors 7 and 8 is shaped like a cylinder and has a prescribed length. In each of the exhaust gas sensors 7 and 8, one end portion serves as a detection portion and electric wires (not shown) are connected to its other end portion.

As shown in FIG. 3, the upstream sensor 7 is attached to a vertical upstream portion of the exhaust pipe 4 in such a manner that its one end portion penetrates through a left side wall of the exhaust pipe 4 and projects inward. The axial direction of the upstream sensor 7 is rotated slightly from the horizontal direction so that the other end portion (left portion) is located slightly higher. Since in this manner the other end portion of the upstream sensor 7 is directed to the inside of the vehicle, the upstream sensor 7 can be protected and made inconspicuous in appearance.

As shown in FIGS. 3-5, the downstream sensor 8 is attached to the slant surface 5d of the silencer 5 in such a manner that its one end portion penetrates through the outer wall of the upper half portion 5a and the U-shaped pipe 54b. More specifically, as described above, the downstream end portion of the U-shaped pipe 54b is bent in the expansion chamber S1 so as to extend alongside the slant surface 5d of the upper half portion 5a. And the outer surface of the U-shaped pipe 54b is in contact with the inner wall surface of the upper half portion 5a. A nut 80 for attachment of the downstream sensor 8 penetrates through the contact portions of the upper half portion 5a and the U-shaped pipe 54b in their thickness direction. Their portions around the nut 80 are welded to each other, whereby the U-shaped pipe 54b, the upper half portion 5a, and the nut 80 are integrated together to form an attachment portion for the downstream sensor 8.

The downstream sensor 8 is attached by screwing its one end portion into the nut 80, whereby its tip detection portion projects into the U-shaped pipe 54b. This structure allows the downstream sensor 8 to perform detection on exhaust gas flowing through the U-shaped pipe 54b. The axial direction of the downstream sensor 8 is inclined so as to extend up forward, more specifically, is perpendicular to the slant surface 5d.

As described above, in the embodiment, a portion of the U-shaped pipe 54b extends alongside the slant surface 5d of the upper half portion 5a and the downstream sensor 8 is disposed at a position where the U-shaped pipe 54b is close to the upper half portion 5a. With this structure, even though the catalyst unit 6 is disposed in the silencer 5, the downstream sensor 8 can be disposed as close to the downstream end portion of the catalyst unit 6.

In particular, since the downstream sensor 8 is attached so as to penetrate through the U-shaped pipe 54b, the downstream sensor 8 can perform detection on exhaust gas before it is diffused in the expansion chamber S1. Thus, an exhaust gas component can be detected stably and lowering of the detection accuracy can be prevented.

Since the downstream sensor 8 is attached to the slant surface 5d, the other end portion of the downstream sensor 8 can be set in the space between the engine 2 and the silencer 5 and hence it is not necessary to form, in the silencer 5, a recess in which to set the downstream sensor 8. Thus, the mounting of the downstream sensor 8 has no influence on the capacity of the silencer 5. Furthermore, the slant surface 5d protects the downstream sensor 8 from events it would otherwise suffer from the rear side. Still further, water is less prone to collect in the downstream sensor 8. What is more, since the other end portion of the downstream sensor 8 is close to the engine 2, routing of the electric wires of the downstream sensor 8 is facilitated.

Since the U-shaped pipe 54b is employed as a pipe that is connected to the downstream end portion of the catalyst unit 6, the silencer 5 as a whole can be prevented from increasing in size in the front-rear direction. Furthermore, the exhaust air flowing direction is reversed by the U-shaped pipe 54b so as to point to the front side, and the downstream end portion of the U-shaped pipe 54b is located on the front side of the center plane, in the front-rear direction, of the silencer 5. The downstream sensor 8 is attached to the downstream end portion of the U-shaped pipe 54b, and, as shown in FIG. 3, the catalyst unit 6 and the downstream sensor 8 are arranged side by side in a vertical plane including the left-right direction in a front half portion of the silencer 5. In this manner, the downstream sensor 8 and the catalyst unit 6 can be arranged close to each other. This makes it possible to increase the temperature of the downstream sensor 8 by allowing it to receive heat from the catalyst unit 6 whose temperature is made relatively high and to thereby increase the detection accuracy of the downstream sensor 8.

Since the catalyst unit 6 is disposed at an upstream position where the temperature of exhaust gas is relatively high, the exhaust gas cleaning effect can be enhanced. Furthermore, the downstream end portion of the U-shaped pipe 54b is opened in the expansion chamber S1 which has a relatively large capacity in the silencer 5. Since in the silencer 5 exhaust gas is diffused first in the expansion chamber S1 having a large capacity, the exhaust gas silencing effect can be enhanced.

As shown in FIG. 3, the downstream sensor 8 is located on the side (left side) that is opposite, in the left-right direction, to an upstream end portion (i.e., a connection portion 40 that is connected to the exhaust pipe 4) of the silencer 5 in a front view. This makes it possible to secure sufficient intervals between the pipes (the baffle pipe 54 including the U-shaped pipe 54b, the communication pipe 51a, etc.) provided in the silencer 5 and to thereby facilitate the attachment and welding of the pipes. Furthermore, since the position of the downstream sensor 8 can be changed merely by changing the inside structure of the silencer 5, that is, without the need for changing the arrangement of the components around the silencer 5.

As shown in FIGS. 2 and 6, the silencer 5 is disposed in the bottom-rear of the engine 2 and the downstream sensor 8 is surrounded by the crank case 20 (front), the silencer 5 (rear), and the vehicle body frame 10 including the suspension brackets 10f and the fixing brackets 10g (left and right). Furthermore, the downstream sensor 8 is covered with the pair of support portions 5e from the left side and the right side. More specifically, as shown in FIG. 6, the pair of (i.e., left and right) fixing brackets 10g are disposed in such a manner that the pair of support portions 5e are interposed between them and the pair of (i.e., left and right) suspension brackets 10f are disposed in such a manner that the pair of fixing brackets 10g are interposed between them. With this structure, the downstream sensor 8 can be protected from thrown-up stones, water, or the like without the need for covering it with a dedicated cover. each support portion 5e is fixed to the associated fixing bracket 10g via a washer and ring-shaped cushions 90. The cushions 90 serve as buffer members, whereby vibration is not prone to be transmitted from the engine 2 to the silencer 5.

The swing arm 18 is disposed above the silencer 5, and the downstream sensor 8 is disposed under the pivot portion 10c for the swing arm 18. With this structure, a necessary space can easily be secured between the engine 2 and the silencer 5. By disposing the downstream sensor 8 in the vicinity of the pivot portion 10c, it is not necessary to take into consideration interference that would otherwise occur between the downstream sensor 8 and the components around the swing arm 18 as the swing arm 18 swings.

Although the above-described embodiment is directed to the case of using the parallel two-cylinder engine 2, the invention is not limited to that case. For example, the engine 2 maybe of a single cylinder type or a type having three or more cylinders. And the arrangement of the cylinders is not limited to the parallel arrangement and may be changed as appropriate.

Although in the above embodiment the vehicle body frame 10 is a diamond-shaped frame, the invention is not limited to that case. For example, the vehicle body frame 10 may be a twin-spar frame.

Although in the above embodiment the entire catalyst unit 6 is located (housed) in the silencer 5, the invention is not limited to that case. It suffices that at least part of the catalyst unit 6 be located in the silencer 5; for example, an upstream end portion of the catalyst unit 6 may stick out of the silencer 5.

Although in the above embodiment at least part of the baffle pipe 54 (the downstream end portion of the U-shaped pipe 54b) extends alongside the outer surface (slant surface 5d) of the silencer 5, the invention is not limited to that case. The entire baffle pipe 54 may extend alongside the outer surface of the silencer 5. A further alternative is possible in which a portion, other than the downstream end portion, of the U-shaped pipe 54b extends alongside the outer surface of the silencer 5 and the downstream sensor 8 is attached to that portion.

Although in the above embodiment the pipe (baffle pipe 54) to which the downstream sensor 8 is attached is, more specifically, the U-shaped pipe 54b, the invention is not limited to that case. The pipe to which the downstream sensor 8 is attached may be a straight pipe or an L-shaped pipe.

Although in the above embodiment the catalyst unit 6 is disposed at an upstream, right-hand position in the silencer 5 and the downstream sensor 8 is attached to the silencer 5 at a left-hand position, the invention is not limited to that case. The catalyst unit 6 and the downstream sensor 8 may be disposed on the left/right sides that are opposite to the above, and they may even be disposed on the same side (left or right side).

Although the embodiment and its modifications have been described above, the embodiment and a modifications) may be combined with each other partially or in their entireties to constitute another embodiment of the invention.

The invention is not limited to the above embodiment but may be changed, modified, or subjected to replacement of a constituent element(s) in various manners without departing from the spirit and scope of the technical concept of the invention. Furthermore, if it becomes possible to implement the technical concept of the invention by another method due to a technical advancement or using another, derivative technique, the invention maybe practiced using that method. As such, the claims should cover all embodiments that can be included in the scope of the technical concept of the invention.

Providing the above-described advantage that a downstream exhaust gas sensor can be disposed without lowering the detection accuracy of an exhaust gas component, the invention is useful when applied to, in particular, an exhaust gas sensor mounting structure that can be applied to automobiles.

What is claimed is:

1. An exhaust gas sensor mounting structure comprising:
   an exhaust pipe attached to a vehicle engine;
   a catalyst unit which cleans exhaust gas of the engine;
   a silencer connected to a downstream portion of the exhaust pipe; and
   an exhaust gas sensor which detects a prescribed component of the exhaust gas, wherein:
   at least part of the catalyst unit is located in the silencer;
   at least part of a pipe that is connected to a downstream end portion of the catalyst unit extends alongside an outer surface of the silencer; and
   the exhaust gas sensor is attached so as to penetrate through an outer wall of the silencer and a wall of the pipe, wherein:
   the silencer has a slant surface that goes down as the position goes forward, and is disposed in bottom-rear of the engine, the slant surface being provided at a front half portion of the silencer; and
   the exhaust gas sensor is attached to the slant surface, and is covered with a crank case, the silencer and a vehicle body frame from the front side, the rear side, and the left and right sides, respectively.

2. The exhaust gas sensor mounting structure according to claim 1, wherein:
   the pipe is a U-shaped pipe, a downstream end portion of which is located on front side of the center, in a front-rear direction, of the silencer; and
   the exhaust gas sensor is attached to the downstream end portion of the pipe.

3. The exhaust gas sensor mounting structure according to claim 1, wherein the catalyst unit and the exhaust gas sensor are arranged side by side in a vertical plane including a left-right direction in a front half portion of the silencer.

4. The exhaust gas sensor mounting structure according to claim 2, wherein the catalyst unit and the exhaust gas sensor are arranged side by side in a vertical plane including a left-right direction in a front half portion of the silencer.

5. The exhaust gas sensor mounting structure according to claim 1, wherein, in a front view, the exhaust gas sensor is disposed on opposite side in the left-right direction to an upstream end portion, connected to the exhaust pipe, of the silencer.

6. The exhaust gas sensor mounting structure according to claim 2, wherein, in a front view, the exhaust gas sensor is disposed on opposite side in the left-right direction to an upstream end portion, connected to the exhaust pipe, of the silencer.

7. The exhaust gas sensor mounting structure according to claim 3, wherein, in a front view, the exhaust gas sensor is disposed on opposite side in the left-right direction to an upstream end portion, connected to the exhaust pipe, of the silencer.

8. The exhaust gas sensor mounting structure according to claim 4, wherein, in a front view, the exhaust gas sensor is disposed on opposite side in the left-right direction to an upstream end portion, connected to the exhaust pipe, of the silencer.

9. The exhaust gas sensor mounting structure according to claim 2, wherein:
   the silencer has a slant surface that goes down as the position goes forward; and
   the exhaust gas sensor is attached to the slant surface.

10. The exhaust gas sensor mounting structure according to claim 3, wherein:
    the silencer has a slant surface that goes down as the position goes forward; and
    the exhaust gas sensor is attached to the slant surface.

11. The exhaust gas sensor mounting structure according to claim 4, wherein:
    the silencer has a slant surface that goes down as the position goes forward; and
    the exhaust gas sensor is attached to the slant surface.

12. The exhaust gas sensor mounting structure according to claim 2, wherein:
    the silencer is disposed in bottom-rear of the engine; and
    the exhaust gas sensor is covered with a crank case, the silencer and a vehicle body frame from the front side, the rear side, and the left and right sides, respectively.

13. The exhaust gas sensor mounting structure according to claim 3, wherein:
    the silencer is disposed in bottom-rear of the engine; and
    the exhaust gas sensor is covered with a crank case, the silencer and a vehicle body frame from the front side, the rear side, and the left and right sides, respectively.

14. The exhaust gas sensor mounting structure according to claim 4, wherein:
    the silencer is disposed in bottom-rear of the engine; and
    the exhaust gas sensor is covered with a crank case, the silencer and a vehicle body frame from the front side, the rear side, and the left and right sides, respectively.

15. The exhaust gas sensor mounting structure according to claim 1, wherein:
    a swing arm is disposed above the silencer; and
    the exhaust gas sensor is disposed below a pivot portion for the swing arm.

16. The exhaust gas sensor mounting structure according to claim 2, wherein:
    a swing arm is disposed above the silencer; and
    the exhaust gas sensor is disposed below a pivot portion for the swing arm.

17. The exhaust gas sensor mounting structure according to claim 3, wherein:
    a swing arm is disposed above the silencer; and
    the exhaust gas sensor is disposed below a pivot portion for the swing arm.

18. The exhaust gas sensor mounting structure according to claim 4, wherein:
  a swing arm is disposed above the silencer; and
  the exhaust gas sensor is disposed below a pivot portion for the swing arm.

* * * * *